Patented Feb. 24, 1931

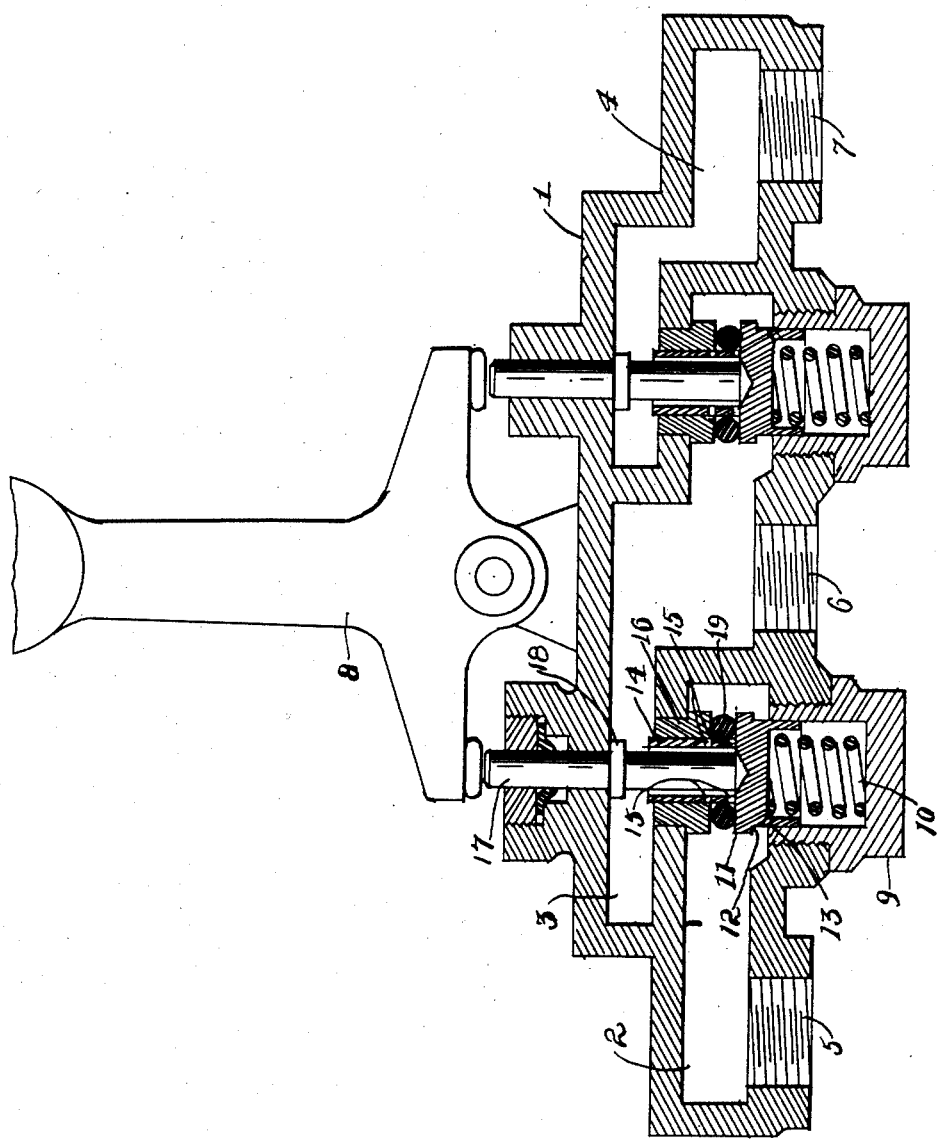

1,793,850

UNITED STATES PATENT OFFICE

STANLEY M. HALSTEAD, ANTON I. WICKLAND, AND WAYNE C. TUSTIN, OF SAN JOSE, CALIFORNIA

VALVE

Application filed September 23, 1929. Serial No. 394,654.

In the operation of certain types of valves such as those used for controlling the flow of compressible fluids, such as air, it is difficult to maintain the usual form of hard valve seat in perfect working condition, and when these seats have outlived their usefulness it is usually difficult to replace them with new seats.

It is one object of the present invention to provide a valve construction wherein a soft rubber valve seat may be used whereby to permit the valve to close at all times without leakage.

It is another object of the invention to provide a device of the character indicated wherein the valve seat may be quickly and easily replaced with a new one when worn.

It is also an object of the invention to provide a valve structure wherein the valve seat can not be displaced through any unequal fluid pressure thereon.

Finally, it is an object to provide a structure that will be economical to manufacture, simple in form and construction, of few parts, positive in operation, and highly efficient in its practical application.

The drawing is a sectional view of a valve embodying our invention.

In the specific embodiment of the invention herein disclosed, we show at 1 the housing which is provided with three chambers as indicated at 2, 3 and 4, each chamber having a tapped opening formed therein as at 5, 6, and 7 respectively to receive a fluid conducting pipe, not shown.

In this type of valve, fluid under pressure is admitted to chamber 3 from chamber 2, and discharged or exhausted from chamber 3 to chamber 4 by the operation of certain valve mechanisms through the medium of a lever 8.

Each of the valve mechanisms referred to comprises a hollow plug as at 9 threaded into the bottom of its respective chamber and having a coiled spring 10 seated therein.

At 11 is shown a valve member having a shoulder 12 formed thereon and having sliding engagement with the open end of part 9 as shown, the said member having an orifice 13 formed therein communicating with the chamber 2 and the interior of the part 9. Formed as an integral part of member 11 and axially disposed relative thereto, is a tubular part 14 having longitudinally spaced orifices as 15 formed therein. The part 14 has sliding engagement with bearing 16 in the top of chamber 2, and has one end of a valve stem as 17 seated therein, the outward movement of the stem being limited by stop 18. Inserted between parts 11 and 16 and encircling tubular part 14 is a rubber washer 19.

When the device is assembled as above described, the member 11 is normally urged into intimate contact with the soft rubber washer 19 by the fluid pressure from chamber 2 so that no fluid can pass thereby. When the lever 8 is actuated to depress the stem 17 the member 11 is depressed and fluid is allowed to pass around the washer 19 and through orifices 15 and part 14 into the chamber 3.

By means of this construction a faulty or worn washer may be quickly replaced with a good one by removing the plug 9, this operation allowing the member 11 and washer 19 to drop out of the housing.

Heretofore it has been found necessary to secure the softer medium of the valve to the plunger or seat by means of a screw, or by crimping the metal over the edge of the soft medium, in order to prevent the fluid under pressure from entering between the softer medium and the part to which it is attached and thereby dislocating the same. Such a construction prohibits the use of a very soft material since it must be firm enough to withstand the clamping action of the screw or crimp.

A particular advantage of our construction is that it permits the use of as soft a medium as desired, with its obvious advantages, and yet effectually prevents displacement. While the washer is definitely confined within fixed limits that effectually prevent its displacement, yet it may change its position as member 11 is operated so that new surfaces are continually being brought into contact and excessive wear upon any one part is prevented.

It is to be understood, of course, that while we have herein shown and described but one specific embodiment of the invention, changes in form, construction, and method of assembly and operation may be made within the scope of the appended claims.

We claim:

1. The combination with a valve head and its seat, of a seating element loosely mounted between the same whereby to prevent the passage of fluid when seated but to permit the free passage of fluid to all sides of the element when the valve is unseated.

2. The combination with a valve seat and valve head of a soft seating element therebetween and movable relative to the seat whereby to prevent the passage of fluid when the valve is closed and to permit the access of fluid to all sides of said element when the valve is opened, and means for preventing displacement of the element when the valve is open.

STANLEY M. HALSTEAD.
ANTON I. WICKLAND.
WAYNE C. TUSTIN.